Figure 1:
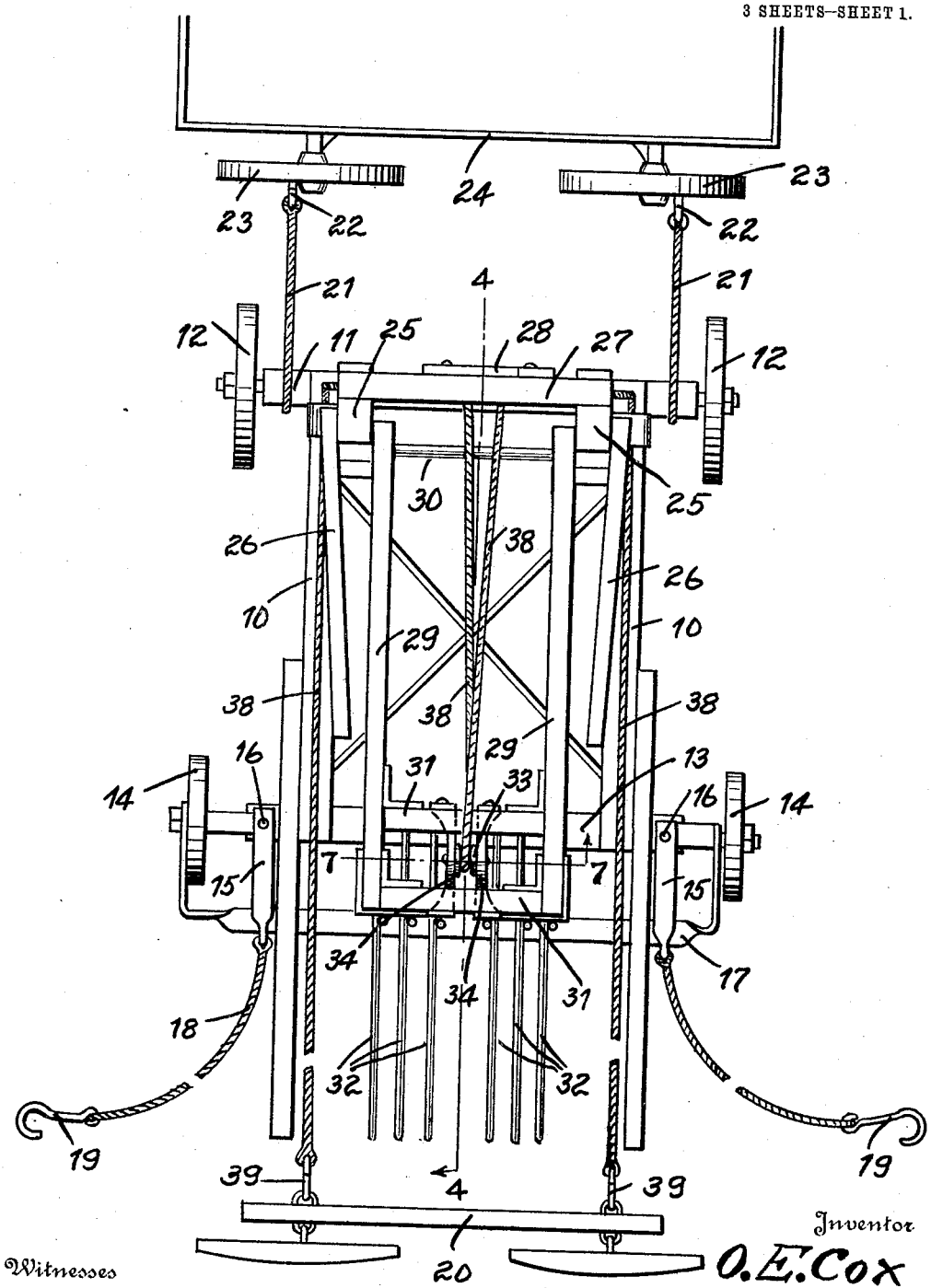

O. E. COX.
HAY PITCHER.
APPLICATION FILED AUG. 12, 1913.

1,109,664.

Patented Sept. 8, 1914.
3 SHEETS—SHEET 1.

Witnesses
M. S. Watson
Francis Boyle

Inventor
O. E. Cox
By
Attorneys

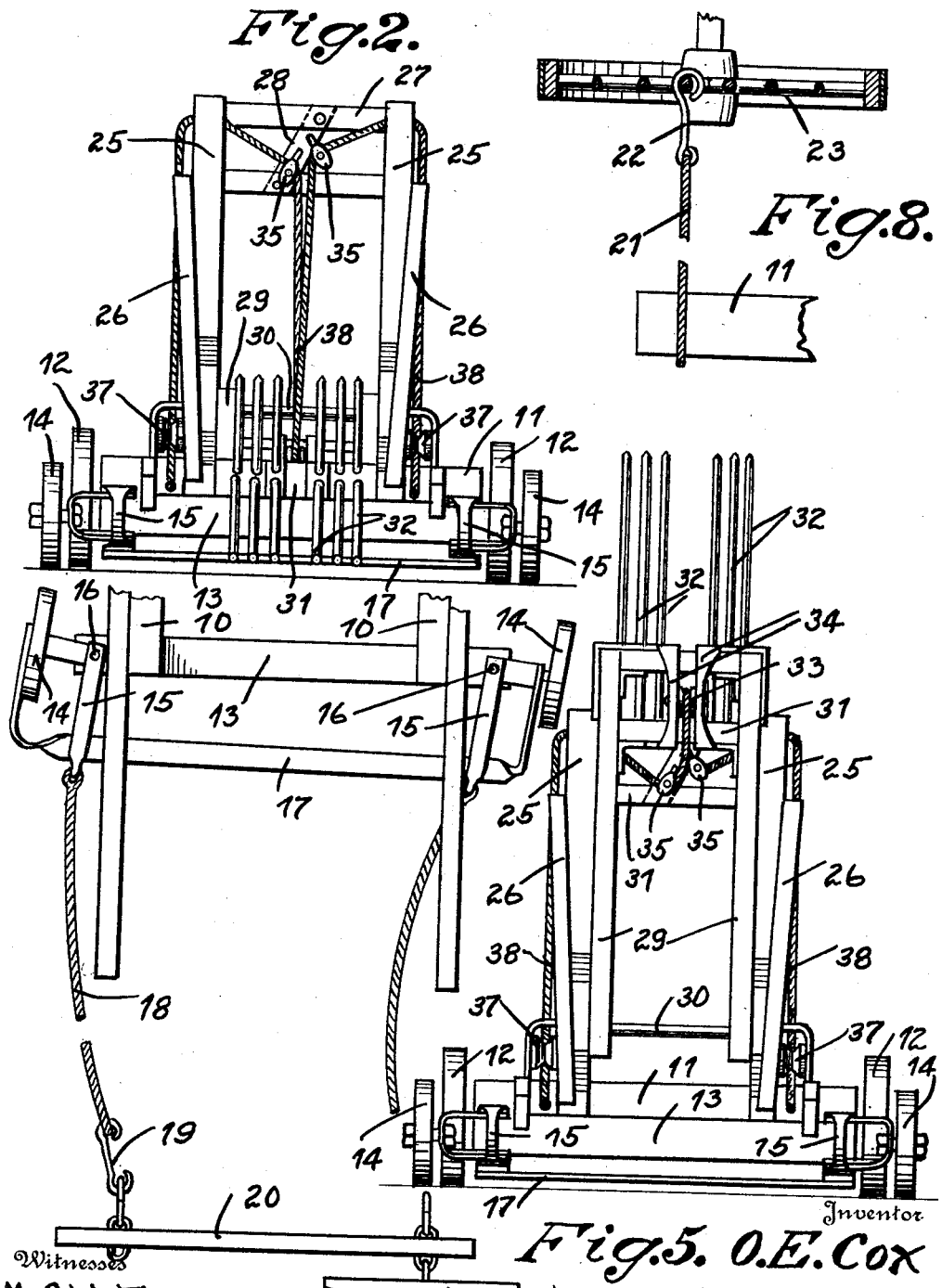

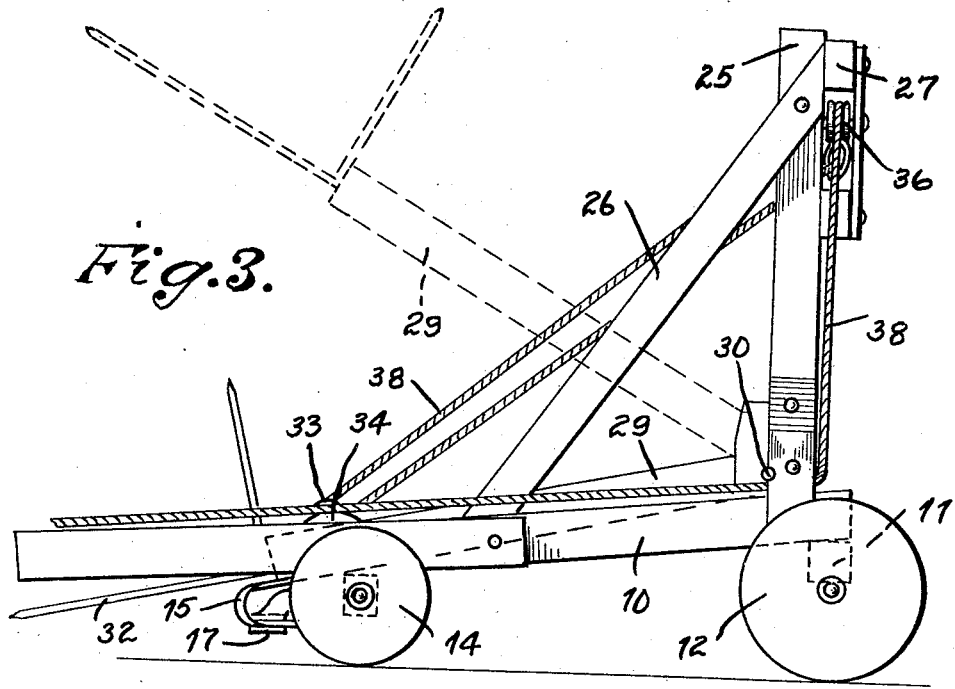
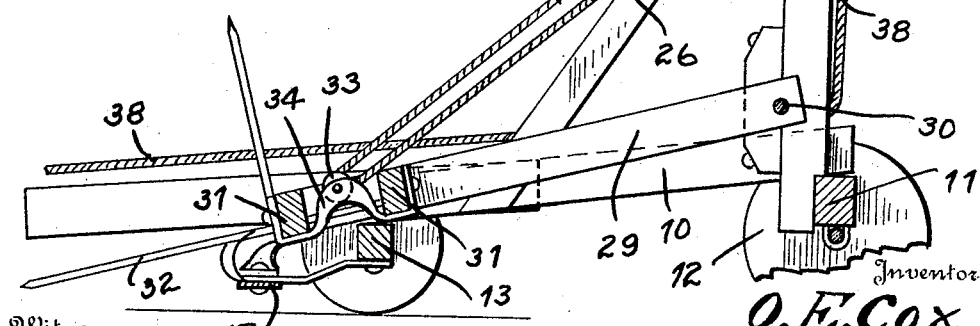

UNITED STATES PATENT OFFICE.

ORLA E. COX, OF HOOPESTON, ILLINOIS.

HAY-PITCHER.

1,109,664.  Specification of Letters Patent.  Patented Sept. 8, 1914.

Application filed August 12, 1913. Serial No. 784,377.

*To all whom it may concern:*

Be it known that I, ORLA E. COX, a citizen of the United States, residing at Hoopeston, in the county of Vermilion, State of Illinois, have invented certain new and useful Improvements in Hay-Pitchers; and I do hereby declare the following to be a full, clear, and exact description of the invention, such as will enable others skilled in the art to which it appertains to make and use the same.

This invention relates to hay pitchers and has for an object to provide an extremely simple and strong device of this character that will have novel means for operating the fork.

A still further object is to provide a hay pitcher having novel means for anchoring the same to the side of a wagon for loading the wagon.

A still further object is to provide a hay pitcher which may be inexpensively constructed and will be formed of a few parts that will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawings illustrating this invention: Figure 1 is a plan view of the pitcher attached to a wagon for loading the latter. Fig. 2 is a front elevation of the pitcher showing the fork lowered. Fig. 3 is a side elevation. Fig. 4 is a longitudinal sectional view on the line 4—4 Fig. 1. Fig. 5 is a front elevation showing the fork raised. Fig. 6 is a plan view of the front portion of the pitcher with the fork removed showing the draft chains. Fig. 7 is a cross sectional view on the line 7—7 Fig. 1. Fig. 8 is a fragmentary sectional view showing the manner of securing the anchoring chains to the wagon to be loaded.

Referring now to the drawings in which like characters of reference designate similar parts, the pitcher is shown to comprise longitudinal sills 10 which are connected at the rear ends by a bolster 11 which carries rear ground wheels 12, the sills being connected at the front ends by a bolster 13 which is equipped at the ends with pivotally attached front ground wheels 14, the same each being journaled in a bracket 15 that is secured by a pivot bolt 16 to the related end of the bolster, both brackets being connected for simultaneous turning by a link 17.

A pair of draft chains 18 are connected to the brackets 15 and are terminally equipped with hooks 19 for engagement with a double-tree 20. A second pair of chains 21 are attached to the rear bolster of the pitcher and are terminally equipped with hooks 22 for attachment to the spokes of the wheels 23 on the same side of a wagon 24 to be loaded, although the hooks may be attached to any other convenient portion of the wagon.

Fixedly secured to the rear ends of the sills are uprights 25 which are braced to the sills by inclined braces 26, and are connected at the upper ends by a pair of cross bars 27, there being an obliquely disposed bar 28 connecting these cross bars near the centers.

The fork comprises fork arms 29 which normally extend nearly horizontal and are pivoted at the rear ends upon a shaft 30 which is terminally connected to the uprights 25 at the lower ends of the latter. The fork arms are connected at the forward ends by cross bars 31 in which the fork prongs 32 are countersunk at the rear ends.

For operating the fork a pulley 33 is journaled at the center of arched bars 34 which bridge the cross bars 31 of the fork and are terminally connected to the cross bars at about the centers thereof. A pair of sheaves 35 are connected to the above described obliquely disposed bar 28 carried by the cross bars of the standards. On the rear sides of the upper ends of the standards are disposed pulleys 36, and on the outer sides of the lower ends of the standards are disposed pulleys 37, the axes of the last named pulleys being disposed transverse of the pitcher and the axes of the first named pulleys being disposed longitudinally of the pitcher.

A looped cable 38 is passed at the bight around the fork pulley 33 and is trained upwardly and the ends rove through the pulleys 35 carried by the obliquely disposed bar 28, thence directed in opposite directions across the standards and rove through the upper pulleys 36 carried by the standards, thence being directed downwardly and rove through the lower pulleys 37 carried by the standards, finally being directed forwardly along the fork and terminally equipped with hooks 39 in advance of the fork.

In operation the fork is loaded, and is then attached to the wagon 24 to be loaded by the anchoring chains 20, as above described. The draft animals are then unhooked from the pitcher, by disengaging the draft chain hooks 19 from the double tree 20. The fork cable is now attached to the double tree by engaging the cable hooks 39 with the double tree, whereupon the draft animals are started up with a resultant pulling forwardly on the ends of the cable and resultant shortening of the bight 28 of the cable whereby the fork is raised to position to discharge its load on to the wagon. The draft animals may then be backed with a resultant lowering of the fork, and may be attached again to the draft chains, whereupon the pitcher is ready to be loaded again in the usual manner after detachment of the anchoring chains from the wagon.

From the above description it will be seen that I have provided an extremely simple and strong hay pitcher that will be effective in operation, and will be formed of a few inexpensive parts that will not easily get out of order.

What is claimed, is:—

1. A pitcher including a wheeled truck, uprights on the rear end of said truck, a hay fork having fork arms pivoted to the lower ends of said uprights, upper pulleys and lower pulleys carried on said uprights, a pair of pulleys centrally secured between the upper ends of said uprights, a pulley centrally secured on said fork, a loop cable having the bight trained over said fork pulley, the ends of said cable being from thence trained through said pair of centrally secured pulleys, and thence directed in opposite directions through said upper upright pulleys and thence directed through said lower upright pulleys, and thence directed forwardly along and beyond said fork, means for anchoring said truck stationary, and a draft appliance attachable to said cable for drawing forwardly said cable with a resultant raising of said fork to dumping position.

2. A pitcher including a wheeled truck, uprights on the rear end of said truck, a hay fork having fork arms pivoted to the lower ends of said uprights, upper pulleys and lower pulleys carried by said uprights, cross bars connecting the upper ends of said uprights, a pair of pulleys carried centrally by said cross bars, a pulley carried centrally by said fork, a looped cable trained at the bight over said fork pulley, the terminals of said cable being thence directed upwardly and trained through said pair of pulleys carried by said cross bars, thence being trained in opposite directions and passed through the pulleys at the upper ends of said uprights, thence trained downwardly and passed through the pulleys at the lower ends of said uprights, thence directed forwardly beyond said fork, means for anchoring said truck stationary, and a draft appliance attachable to the ends of said cable for drawing out said cable with a resultant raising of said fork to dumping position.

In testimony whereof, I affix my signature, in the presence of two witnesses.

ORLA E. COX.

Witnesses:
CECIL YOUNG,
C. E. COX.

---

Copies of this patent may be obtained for five cents each, by addressing the "Commissioner of Patents, Washington, D. C."